(12) United States Patent
Itakura (10) Patent No.: US 8,371,643 B2
(45) Date of Patent: Feb. 12, 2013

(54) LOWER STRUCTURE OF VEHICLE FRONT PILLARS

(75) Inventor: Akira Itakura, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 167 days.

(21) Appl. No.: 12/780,289

(22) Filed: May 14, 2010

(65) Prior Publication Data

US 2010/0295336 A1 Nov. 25, 2010

(30) Foreign Application Priority Data

May 19, 2009 (JP) ................................. 2009-120556

(51) Int. Cl.
*B62D 25/02* (2006.01)
(52) U.S. Cl. .................... 296/203.03; 296/209
(58) Field of Classification Search ............ 296/146.11, 296/187.1, 187.12, 193.06, 193.05, 203.02, 296/209, 203.03; *B62D 25/02*
See application file for complete search history.

(56) References Cited

U.S. PATENT DOCUMENTS

| | | | | |
|---|---|---|---|---|
| 5,613,727 A * | 3/1997 | Yamazaki | ................. | 296/203.03 |
| 5,653,495 A | 8/1997 | Bovellan et al. | | |
| 6,073,992 A * | 6/2000 | Yamauchi et al. | ........ | 296/203.01 |
| 6,315,353 B1 * | 11/2001 | Brodt et al. | .............. | 296/203.03 |
| 6,386,625 B1 * | 5/2002 | Dukat et al. | .................. | 296/209 |
| 6,679,547 B2 * | 1/2004 | Ju-Sik | ...................... | 296/203.03 |
| 7,494,180 B2 * | 2/2009 | Rill | ................................ | 296/209 |
| 8,011,721 B2 * | 9/2011 | Yamada et al. | ................ | 296/209 |
| 2009/0261622 A1 * | 10/2009 | Rill et al. | ...................... | 296/209 |

FOREIGN PATENT DOCUMENTS

| | | |
|---|---|---|
| DE | 4394609 T1 | 7/1995 |
| DE | 19838955 A1 | 3/2000 |
| DE | 19913078 A1 | 9/2000 |
| DE | 10140503 A1 | 3/2003 |
| DE | 102005050959 A1 | 7/2007 |
| JP | 10-007020 A | 1/1998 |
| JP | 11192969 A | 7/1999 |
| JP | 2000-211549 A | 8/2000 |

OTHER PUBLICATIONS

German Office Action for Application No. DE 10 2010 022 151.1 dated Dec. 21, 2011.
English Translation of German Office Action for Application No. DE 10 2010 022 151.1 dated Dec. 21, 2011.

* cited by examiner

*Primary Examiner* — Glenn Dayoan
*Assistant Examiner* — Pinel Romain
(74) *Attorney, Agent, or Firm* — Lerner, David, Littenberg, Krumholz & Mentlik, LLP (57) ABSTRACT

In lower structures for vehicle front pillars, there are paired right and left side sills arranged in lower portions on both sides of a vehicle, respectively; an outer portion, in a vehicle width direction, of each side sill is formed of an outer reinforcement for a side sill; a inner panel for the side sill is arranged on an inner side, in the vehicle width direction, of each side sill; the front pillars are formed so as to stand on front ends of the side sills, respectively; outer panels for side bodies cover outer reinforcements for the respective front pillars and parts of the respective side sills; each outer reinforcement for side sill is segmented, in the vehicle front and rear direction, into three parts, that is to say, first to third components positioning sequentially from a front of the vehicle; strengths of the first to third components are set to be higher sequentially in this order; and the first, second, and third components are joined and integrated together.

8 Claims, 6 Drawing Sheets

LOWER STRUCTURE OF VEHICLE FRONT PILLARS

CROSS-REFERENCE TO RELATED APPLICATIONS

This application claims the benefit of the filing date of Japanese Patent Application No. 2009-120556 filed May 19, 2009, the entire disclosure of which is hereby incorporated herein by reference.

FIELD OF THE INVENTION

The present invention relates to a lower structure of vehicle front pillars in which lower portions of the front pillars can absorb an impact applied to a vehicle body via the wheels during a vehicle collision.

BACKGROUND OF THE INVENTION

"JP 10-007020A" proposes lower vehicle body structure in which lower portions of front pillars can absorb an impact applied to a vehicle body via wheels during a collision, even if the vehicle body structure does not allow lower end portions of the front pillars to project toward the front of the vehicle. In the structure, a mounting portion of a lower door hinge, which mounts to the front pillar, is attached to a lower part of an outer sidewall portion in the vehicle width direction, which constitutes an outer portion of each front pillar in the vehicle width direction. Furthermore, one bead, which protrudes in a semicircular shape toward the outer side in the vehicle width direction, is formed in a middle portion of the mounting portion in the front and rear direction, so as to extend along the vertical direction. In addition, another bead is also formed in an outer wall portion, in the vehicle width direction, of an outer panel for the front pillar, which is opposed to the one bead.

Regarding the recent trend in which outer shapes of outer reinforcements for side sills become larger in the vehicle width direction, "JP 2000-211549 A" proposes the following front structure of a vehicle body as an example of structure for lower end portions of front pillars and front portions of outer reinforcements for side sills. Specifically, a reinforced member is arranged in an inner portion of the outer reinforcement for the side sill in the vehicle width direction, so as to extend in the vehicle front and rear direction. A notch formed in the outer reinforcement for the front pillar is blocked by an inner part of a front wall portion of the reinforced member in the vehicle width direction, and an inner part of a wide portion of the reinforced member in the vehicle width direction, so that the front structure of the vehicle body can withstand an impact load during a vehicle offset collision.

SUMMARY OF THE INVENTION

However, the structure proposed in "JP 10-007020 A" has the following problems. Specifically, since the structure in which the bead is provided to the door hinge is for absorbing impacts, it is difficult to secure sufficient rigidity of the front pillars while opening and closing the doors. Since the shape of the door hinge is unusual, the general versatility of the door hinge is inferior. Furthermore, since the bead is formed in multiple positions, the molding performance of the vehicle side component is inferior.

The structure proposed in "JP 2000-211549 A", has the following problems, for example. Specifically, it is difficult for the lower portion of the front pillar to absorb the impact applied to the vehicle body via wheels during a vehicle collision, and furthermore, the molding performance of the front pillar outer reinforcement is inferior. Therefore, operations for sealing panel ends become complex.

The present invention has been made in view of the above problems, and has an object to provide a lower structure of vehicle front pillars which is formed simply, so that lower portions of the front pillars can absorb an impact applied to a vehicle body via wheels during a vehicle collision.

To achieve the above object, the invention according to a first aspect is a lower structure of vehicle front pillars in which paired right and left side sills are arranged in lower portions on both lateral sides of a vehicle, respectively, so as to extend in a vehicle front and rear direction, an outer portion, in a vehicle width direction, of each the side sill is formed of an outer reinforcement for the side sill, an inner panel for the side sill is arranged on an inner side, in the vehicle width direction, of each side sill, the front pillars are formed so as to stand on front ends of the side sills, respectively, a hinge for a front door is attached to each front pillar, outer panels for side bodies cover outer reinforcements for the respective front pillars and parts of the respective side sills. The structure is characterized in that each outer reinforcement for the side sill is segmented, in the vehicle front and rear direction, into three parts, such as a first component, a second component, and a third component positioned sequentially from a front of the vehicle, strengths of the first, second, and third components are set to be higher sequentially in this order, and the first, second, and third components are joined and integrated together.

The invention according to a second aspect is characterized in that, in the invention according to the first aspect, the strengths of the first, second, and third components are set to be higher sequentially in this order by making thicknesses of the first, second, and third components larger sequentially in this order, or by raising material strengths of the first, second, and third components larger sequentially in this order.

The invention according to a third aspect is characterized in that, in the invention according to the first or second aspect, a front end portion of the third component has a cross sectional shape becoming narrower toward the front of the vehicle, and a front end of the third component is arranged so as to overlap with the hinge for the front door in the vehicle front and rear direction.

The invention according to a fourth aspect is characterized in that, in the invention according to any one of the first to third aspects, the third component, the second component, and the inner panel for the side sill are bolted to one another.

The invention according to a fifth aspect is characterized in that, in the invention according to any one of the first to fourth aspects, the first component is configured as a drawn product so that a separating line between components does not appear on a surface of the front end of each side sill.

The invention according to a sixth aspect is characterized in that, in the invention according to any one of the first to fifth aspects, each outer panel for the side body and the corresponding outer reinforcement for the front pillar have lower edges, respectively, and the lower edges aligned on a substantial center, in a vertical direction, of the corresponding side sill.

In the invention according to the first aspect, each outer reinforcement for the side sill is segmented into three parts in the vehicle front and rear direction, that is to say, the first component, the second component, and the third component positioning sequentially from the front of the vehicle, and the strengths of the first, second, and third components are set to be higher sequentially in this order. Therefore, the majority of an impact generated during a vehicle collision, can be effectively absorbed by deformation of the first component which is arranged at the front end position in the vehicle front and rear direction and has the lowest strength of all the components. Furthermore, the remaining impact, which cannot be absorbed by the first component, is absorbed sequentially by the subsequent second and third components. Therefore, deformation of a vehicle compartment according to the impact is inhibited. Furthermore, the first, second, and third components can be formed in shapes with fine molding performance, according to the strengths (thicknesses, types of material, etc) of the first, second, and third components. In particular, since the first component has the lowest strength and possesses fine workability, the first component can easily be formed in a bag shape, for example, by deep drawing using a press.

In the invention according to the second aspect, the strengths of the first, second, and third components can be set to be higher sequentially in this order by making the thicknesses of the first, second, and third components larger in that order, or by raising material strengths of the first, second, and third components larger in that order.

In the invention according to the third aspect, the front end of the third component does not have an opening. Alternatively, the front end portion of the third component is formed to have a cross sectional shape becoming narrower toward the front of the vehicle. In addition, the front end of the third component is arranged so as to overlap with the hinge for the front door in the vehicle front and rear directions. Therefore, the strength and rigidity of the third component are increased, so that a withstanding performance against an impact generated during a vehicle collision, is enhanced. Furthermore, since this third component increases the rigidity of the front pillar, a problem, such as deformation of the front pillar according to impacts input to the hinge for the front door while opening and closing the door, is avoided.

In the invention according to the fourth aspect, the third component and the second component, and the inner panel for the side sill, are fastened to one another with a bolt. Accordingly, the rigidity of the side sill is increased, so that deformation of a transverse sectional shape in the side sill, during a vehicle collision, is inhibited. Therefore, a withstanding performance against an impact generated during a vehicle collision, becomes stronger. In addition, if the third component, the second component, and the inner panel for the side sill are spot-welded together, it is necessary to form a large work hole to allow a spot-welding gun therethrough in a dash side panel, so that strength and rigidity of the dash side panel decrease. On the other hand, when the three flanges are fastened by a bolt, it is necessary to form only a small work hole, which is large enough to allow a bolt fastening tool therethrough, in the dash side panel, so that a problem such as the decrease of strength and rigidity of the dash side panel, does not occur.

In the invention according to the fifth aspect, the first component is configured as a drawn product, so that a separating line between components does not appear on a surface of the front end of each side sill. Accordingly, since operation for coating the front end surface of the side sill with a sealer, is no longer required, labor as well as cost can be reduced.

In the invention according to the sixth aspect, each of the outer panel for the side body and the outer reinforcement for the front pillar is not formed in a bag shape extending down to the lower end of the side sill. Alternatively, the outer panel for the side body and the outer reinforcement for the front pillar, have lower edges which may be aligned on a substantial center, in the vertical direction, of the side sill. Therefore, the molding performance of each of the outer panel for the side body and the outer reinforcement for the front pillar, can be enhanced, and furthermore operation for coating their aligned end portions with a sealer, can be made simpler, so that the workability can be enhanced.

In addition, since the outer panel for the side body is not formed to extend down to the lower end of the side sill, weight and cost can be reduced. Furthermore, since the outer reinforcement for the side sill is arranged in an outermost surface of the vehicle, it is possible to form a large transverse cross section of the outer reinforcement for the side sill, so that the rigidity thereof increases.

BRIEF DESCRIPTION OF THE DRAWINGS

FIG. 8 is across sectional view taken along the line B-B of FIG. 5.

FIG. 9 is across sectional view taken along the line C-C of FIG. 6.

DETAILED DESCRIPTION OF THE PREFERRED EMBODIMENTS

Hereinafter, an embodiment of the present invention will be described with reference to the accompanying drawings.

Figure 1:
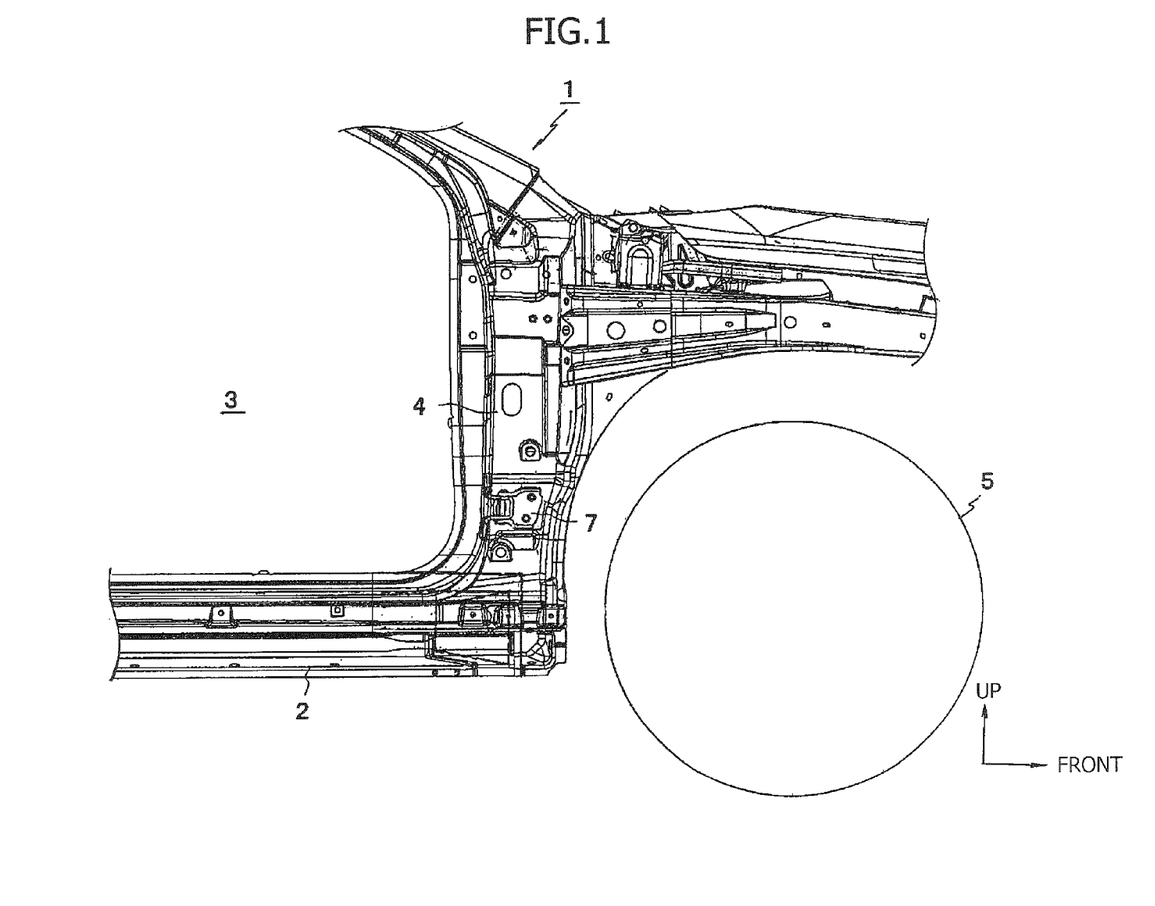
FIG. 1 is a side view of a front portion of a vehicle showing a lower structure of a front pillar according to the present invention.
Figure 2:
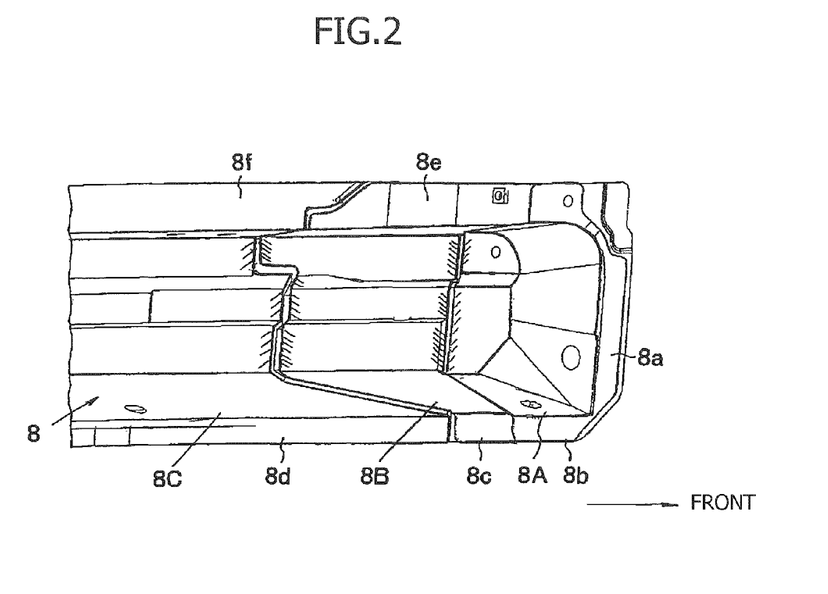
FIG. 2 is a partial perspective view showing a three segment structure of an outer reinforcement for a side sill.
Figure 3:
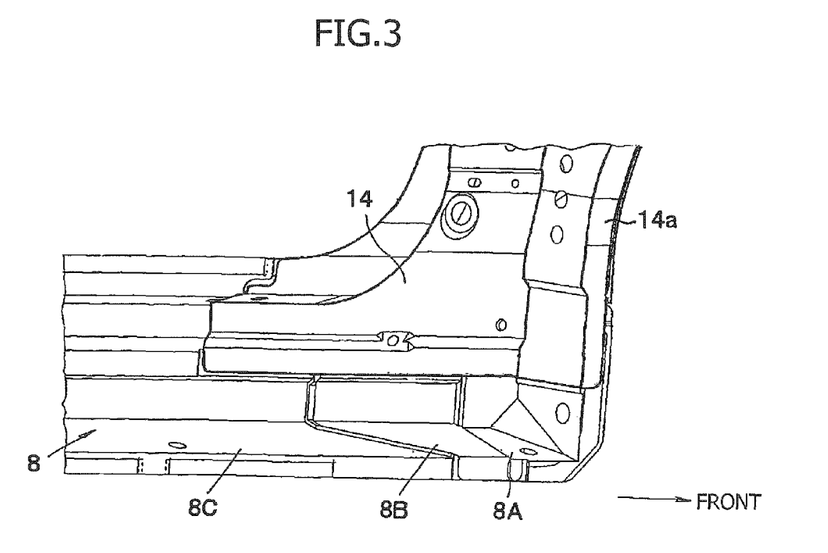
FIG. 3 is a partial perspective view showing a state in which an outer reinforcement for the front pillar is mounted on the outer reinforcement for side sill shown in FIG. 2.
Figure 4:
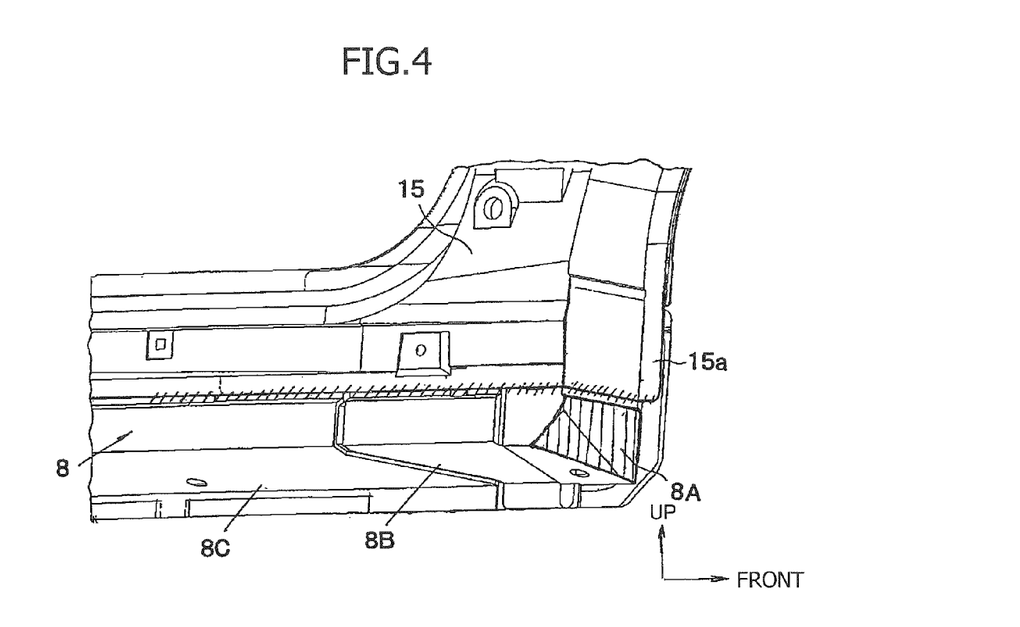
FIG. 4 is a partial perspective view showing a state in which an outer panel for a side body is mounted on the outer reinforcement for the front pillar and the outer reinforcement for the side sill shown in FIG. 3.
Figure 5:
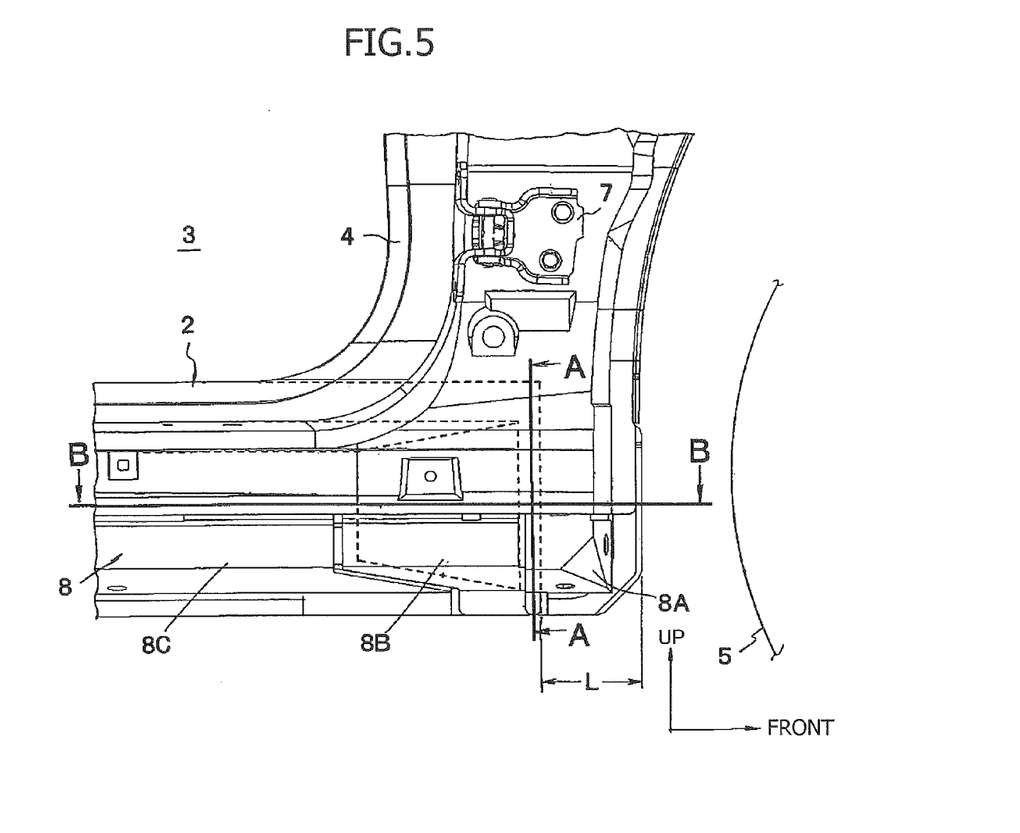
FIG. 5 is a partial side view of a lower portion of the front pillar.
Figure 6:
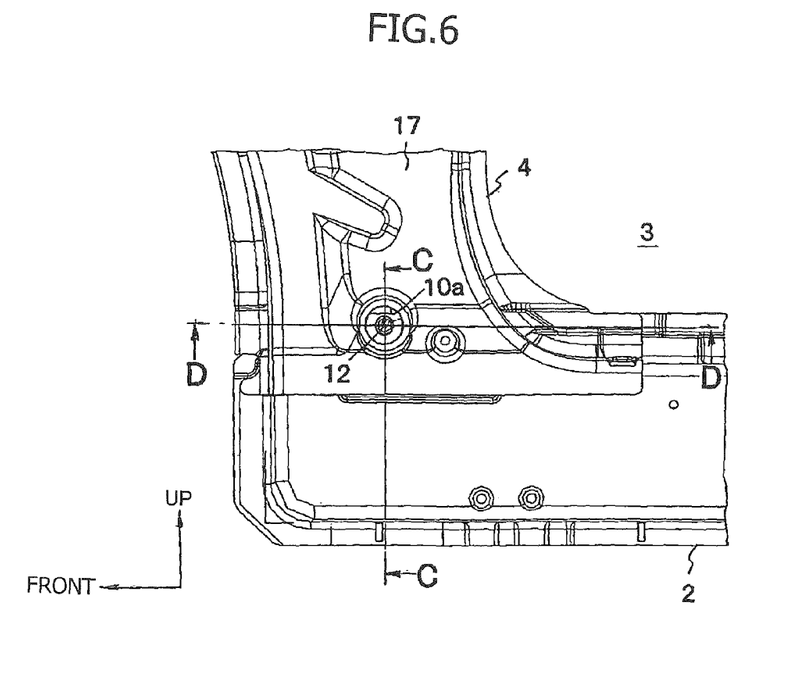
FIG. 6 is a partial side view of the lower portion of the front pillar as seen from a vehicle compartment side.
Figure 7:
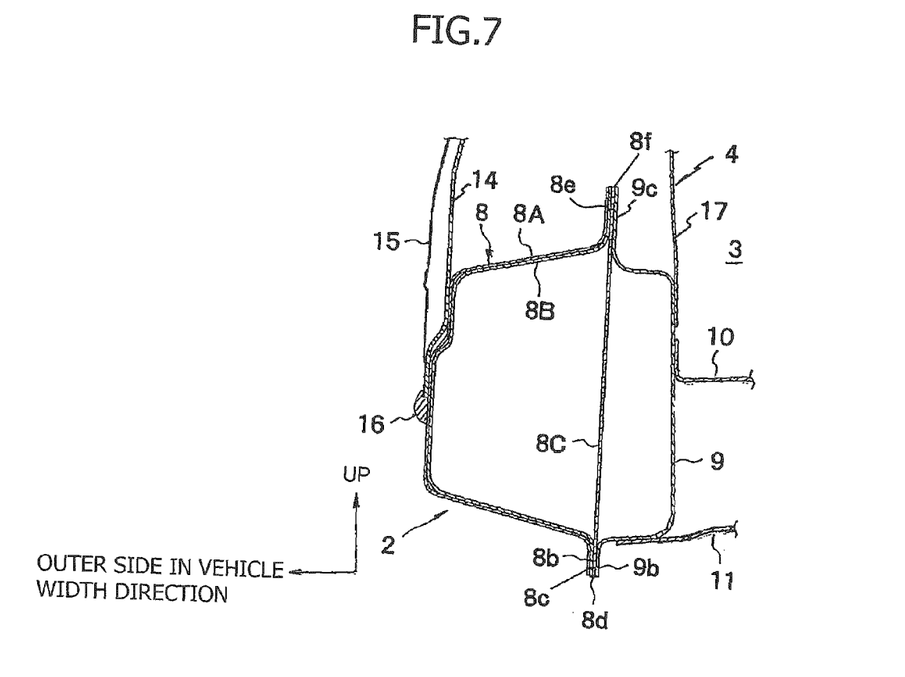
FIG. 7 is a cross sectional view taken along the line A-A of FIG. 5.
Figure 8:
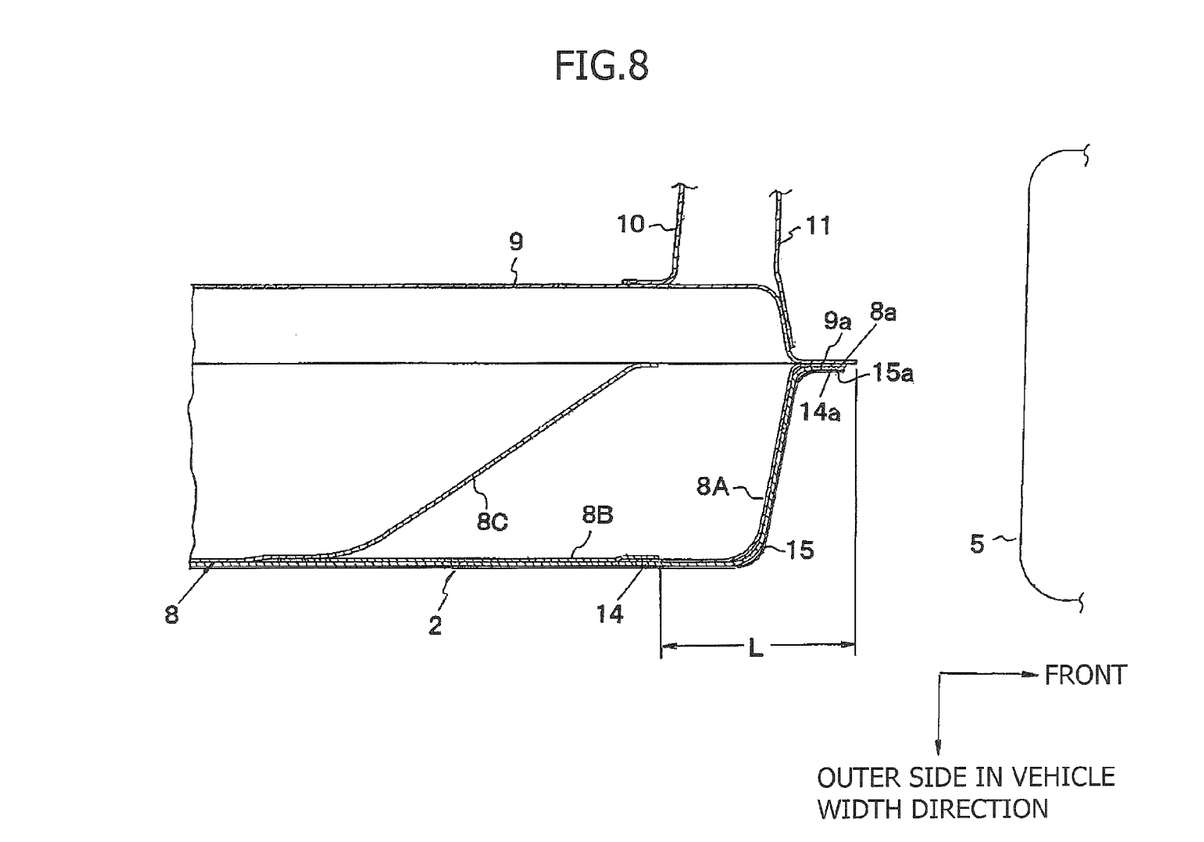
Figure 9:
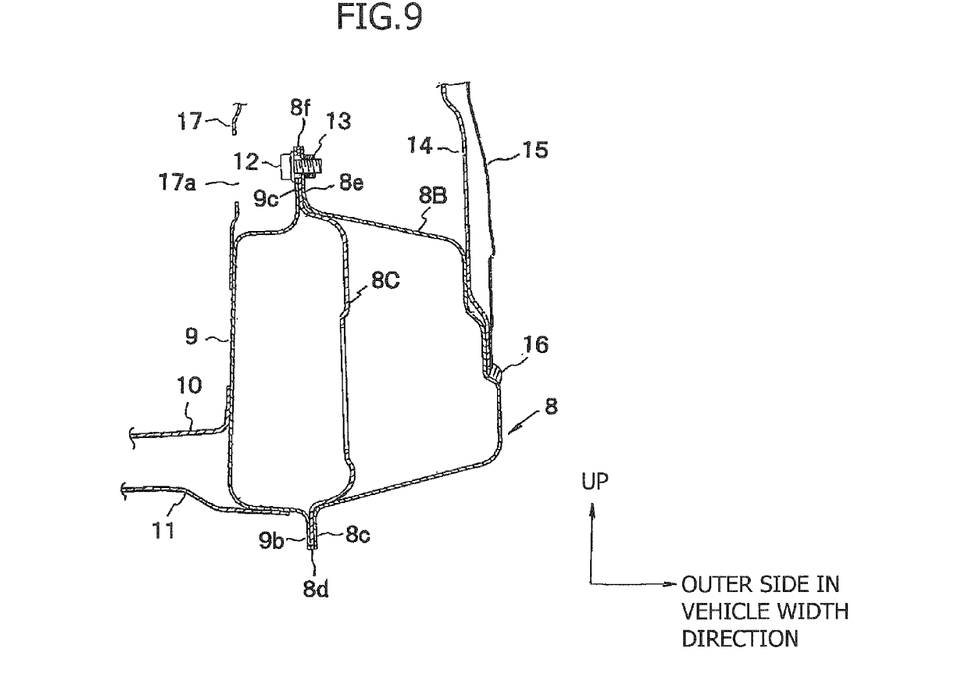
Figure 10:
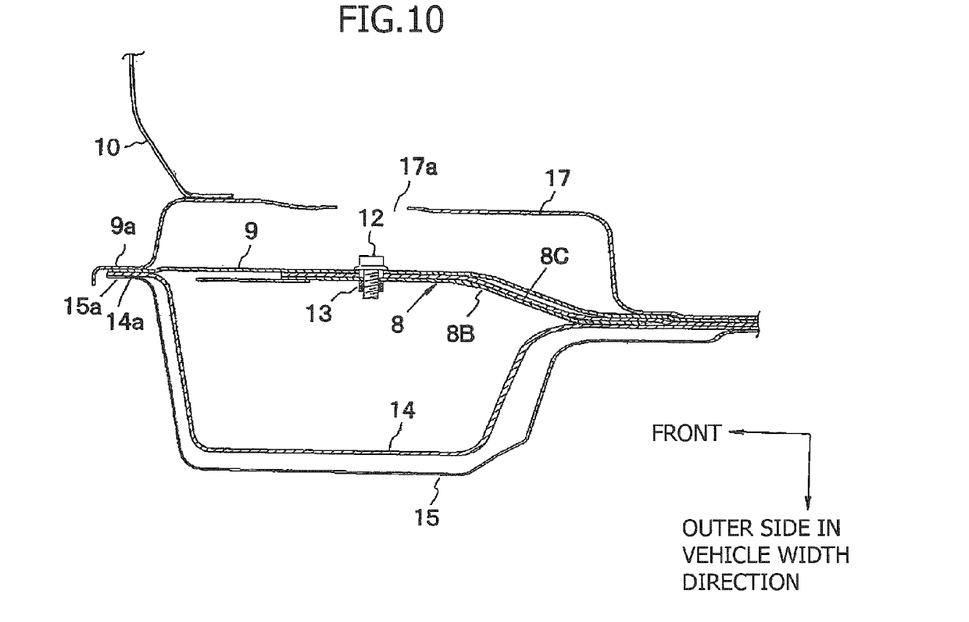
FIG. 10 is a cross sectional view taken along the line D-D of FIG. 6.

FIG. 1 is a side view of a front portion of a vehicle showing a lower structure of a front pillar according to the present invention. FIG. 2 is a partial perspective view showing a three segment structure of an outer reinforcement for a side sill. FIG. 3 is a partial perspective view showing a state in which an outer reinforcement for the front pillar is mounted on the outer reinforcement for the side sill shown in FIG. 2. FIG. 4 is a partial perspective view showing a state in which an outer panel for a side body is mounted on the outer reinforcement for the front pillar and the outer reinforcement for the side sill shown in FIG. 3. FIG. 5 is a partial side view of a lower portion of the front pillar. FIG. 6 is a partial side view of the lower portion of the front pillar as seen from a vehicle compartment side. FIG. 7 is a cross sectional view taken along the line A-A of FIG. 5. FIG. 8 is a cross sectional view taken along the line B-B of FIG. 5. FIG. 9 is a cross sectional view taken along the line C-C of FIG. 6. FIG. 10 is a cross sectional view taken along the line D-D of FIG. 6.

As shown in FIG. 1, paired right and left side sills 2 are arranged in lower portions of both sides of a vehicle 1, respectively, so as to extend in the vehicle front and rear directions. In front portions of a vehicle compartment 3, front pillars 4 are provided so as to stand on the front ends of the side sills 2, respectively. Rotatable paired right and left front wheels 5 are arranged in front of lower portions of the front pillars 4, respectively. Hinges for front doors 7 (only the lower one is shown) are attached to upper and lower portions of each front pillar 4, respectively. These hinges for front door 7 (only the lower one is shown) allow a front side door, which is not shown, to be mounted to the front pillar 4 in an openable and closable manner.

As shown in FIGS. 7 to 10, an outer portion, in the vehicle width direction, of each of the paired right and left side sills 2, is formed of an outer reinforcement for the side sill 8. An inner panel for the side sill 9 is arranged on an inner side, in the vehicle width direction, of each side sill 2. Each side sill 2 has a closed cross section structure which is configured by the corresponding outer reinforcement for the side sill 8 and the corresponding inner panel for the side sill 9. In addition, end portions, in the vehicle width direction, of each of a dash panel 10 and a dash lower panel 11, are spot-welded to the respective inner panels for the side sills 9 which are arranged on the inner sides, in the vehicle width direction, of the side sills 2. The dash panel 10 separates the vehicle compartment 3 from an engine compartment, which is not shown, and is formed in front of the vehicle compartment 3 in the vehicle front and rear directions. The dash lower panel 11 is arranged below the dash panel 10.

In this embodiment, as shown in FIGS. 2 and 8, each outer reinforcement for the side sill 8 is segmented into three parts in the vehicle front and rear direction, that is to say, a first component 8A, a second component 8B, and a third component 8C positioned sequentially from the front of the vehicle. These first, second, and third components 8A, 8B, and 8C are joined and integrated together by spot welding. Furthermore, the strengths of the first, second, third components 8A, 8B, and 8C are set to be higher sequentially in this order. Specifically, the strengths of the first, second, third components 8A, 8B, and 8C are set to be higher sequentially in this order by making the thicknesses of the first, second, third components 8A, 8B, and 8C larger in that order, or by raising the material strengths of the first, second, third components 8A, 8B, and 8C in that order.

The first component 8A constituting the outer reinforcement for the side sill 8, has the lowest strength, and therefore possesses fine workability. Such a first component 8A can be easily formed into a bag-like gusset by deep drawing using a press, for example. As shown in FIG. 8, a front end flange 8a of the first component 8A is spot-welded to a front end flange 9a of the inner panel for the side sill 9. Therefore, a structure in which a separating line between the components does not appear on a front end surface of the side sill 2 (the outer reinforcement for the side sill 8), is obtained.

In addition, regarding the outer reinforcement for the side sill 8, a rear end portion of the first component 8A is overlapped with a front end portion of the second component 8B from the outer side as shown in FIG. 8, and a lower flange 8b of the first component 8A, a lower flange 8c of the second component 8B, a lower flange 8d of the third component 8C, and a lower flange 9b of the inner panel for the side sill 9 are overlapped with one another as shown in FIG. 7 and are spot-welded together. Consequently, the first component 8A is joined to and integrated with the second component 8B, the third component 8C, and the inner panel for the side sill 9. Then, as shown in FIG. 8, a rear end portion of the second component 8B is overlapped with a front end portion of the third component 8C from the outer side and spot-welded thereto. Furthermore, as shown in FIGS. 9 and 10, an upper flange 8e of the second component 8B, an upper flange 8f of the third component 8C, and an upper flange 9c of the inner panel for side sill 9 are overlapped with one another, and are fastened to one another with a bolt 12 and a welded nut 13. Therefore, the second component 8B, the third component C, and the inner panel for the side sill 9 are joined and integrated together.

The welded nut 13 is, in advance, welded to the upper flange 8e of the second component 8B, and a dash side panel 17 has a work hole 17a which is formed in a portion thereof facing the bolt 12. The bolt 12 is allowed through the work hole 17a, and then is fastened into the welded nut 13 with an tool, which is not shown. If the upper flange 8e of the second component 8B, the upper flange 8f of the third component 8C, and the upper flange 9c of the inner panel for the side sill 9 are spot-welded together, a large work hole to allow a spot-welding gun which is not shown, therethrough, has to be formed in the dash side panel 17, so that strength and rigidity of the dash side panel 17 decrease. On the other hand, when the three flanges are fastened by the bolt 12 as in the case of this embodiment, it is necessary to form only the small work hole 17a, which is large enough to allow a tool to fasten the bolt 12 therethrough, in the dash side panel 17, so that the problem of the decrease in strength and rigidity of the dash side panel 17 does not occur.

As shown in FIG. 8, the front end portion of the third component 8C of the outer reinforcement for the side sill 8, has a cross sectional shape becoming narrower toward the front of the vehicle (in other words, the third component 8C has a narrowed cross section of an substantially hat shape when seen in the vehicle front and rear direction. Furthermore, the depth of the hat shape in the vehicle width direction becomes smaller toward the front of the vehicle, and reaches zero at the front end thereof) . In addition, as shown in FIG. 5, the front end of the third component 8C is arranged so as to overlap with the hinges for front doors 7 in the vehicle front and rear direction, and also is arranged so as to be aligned on the position of the front end of the second component 8B in the outer reinforcement for the side sill 8.

The outer reinforcement for the side sill 8 shown in FIGS. 2 and 8 is configured by joining and integrating the first component 8A, the second component 8B, and the third component 8C together as described above. As shown in FIGS. 3 and 7 to 10, an outer reinforcement for the front pillar 14 of the front pillar 4 is brought into contact with part of the outer reinforcement for the side sill 8, from the outer side, and is spot-welded thereto. In addition, as shown in FIGS. 4 and 7 to 10, an outer panel for the side body 15 constituting an outer portion, in the vehicle width direction, of the front pillar 4, is overlapped with an outer face of the outer reinforcement for the front pillar 14 from the outer side, and is spot-welded thereto. Specifically, as shown in FIGS. 8 and 10, the outer reinforcement for the front pillar 14 and the outer panel for the side body 15 of the front pillar 4, have front end flanges 14a and 15a, respectively. The front end flanges 14a and 15a are overlapped with the front end flange 9a of the inner panel for the side sill 9, from the outer side, and are spot-welded thereto. In addition, as shown in FIGS. 7 and 9, lower edges of the outer reinforcement for the front pillar 14 and the outer panel for the side body 15, are aligned on the position of a substantial center, in the vertical direction, of the outer reinforcement for the side sill 8, and those portions are spot-welded to the outer reinforcement for the side sill 8. Furthermore, those end portions are coated with a sealer 16.

In this embodiment, each of the outer reinforcements for the side sill 8 is segmented into three parts in the vehicle front and rear direction, that is to say, a first component 8A, a second component 8B, and a third component 8C positioning sequentially from the front of the vehicle, and the strengths of the first, second, and third components 8A, 8B, and 8C are set to be higher sequentially in this order. Accordingly, a large portion of an impact generated during a vehicle collision, is effectively absorbed by deformation of the first component 8A (the part having a length L shown in FIGS. 5 and 8) which is located at the front end position in the vehicle front and rear direction and has the lowest strength out of all the components 8A, 8B, and 8C. Furthermore, the remaining impact which cannot be absorbed by the first component 8A is absorbed sequentially by the subsequent second component 8B and the third component 8C. Therefore, deformation of the vehicle compartment 3, according to the impact, is inhibited.

In addition, the first component 8A, the second component 8B, and the third component 8C of the outer reinforcement for the side sill 8, can be formed into shapes with fine molding performance, according to the strengths (thicknesses, types of material, etc) of the first, second, and third components 8A, 8B, and 8C. In particular, since the first component 8A has the lowest strength, and has fine workability, it can easily be formed into a bag shape by deep drawing using a press, for example.

In this embodiment, the front end of the third component 8C of the outer reinforcement for the side sill 8 does not have an opening. Alternatively, the front end portion of the third component 8C is formed so as to have a cross sectional shape becoming narrower toward the front of the vehicle. In addition, the front end of the third component 8C is arranged so as to overlap with the hinges for the front door 7 in the vehicle front and rear direction, and also placed so as to be aligned on the position of the front end of the second component 8B in the outer reinforcement for the side sill 8. Accordingly, the strength and rigidity of the third component 8C are increased, so that it can fully withstand an impact generated during a vehicle collision. Furthermore, since this third component 8C increases the rigidity of the front pillar 4, such a problem as deformation of the front pillar 4 according to impacts inputted to the hinges for the front door 7 (only the lower one is shown) while opening and closing the door, is avoided.

In this embodiment, the second component 8B and the third component 8C of the outer reinforcement for the side sill 8, and the inner panel for the side sill 9 are fastened to one another with the bolt 12, in the vicinity of the front end portion of the third component 8C in the outer reinforcement for the side sill 8. Accordingly, the rigidity of the side sill 2 is increased, so that deformation of a transverse sectional shape in the side sill 2 during a vehicle collision is inhibited. Therefore, a withstanding performance against an impact generated during a vehicle collision becomes stronger. The transverse cross section means a cross section which is seen in the vehicle front and rear directions.

In this embodiment, the first component 8A of the outer reinforcement for the side sill 8 is configured as a drawn product, so that a separating line between the components does not appear on the front end surface of the side sill 2 (the outer reinforcement for the side sill 8). Accordingly, operation for coating the front end surface of the side sill 2 with a sealer is no longer required, so that labor as well as cost can be reduced.

In this embodiment, each of the outer panel for the side body 15 and the outer reinforcement for the front pillar 14, is not formed in a bag shape extending down to the lower end of the side sill 2 (the outer reinforcement for the side sill 8). Alternatively, the outer panel for the side body 15 and the outer reinforcement for the front pillar 14 have lower edges, respectively, so that the lower edges may be aligned on the position of a substantial center, in the vertical direction, of the side sill 2 (the outer reinforcement for the side sill 8). Therefore, the molding performance of each of the outer panel for the side body 15 and the outer reinforcement for the front pillar 14 can be enhanced, and also operation for coating their aligned end portions with the sealer 16, can be made simpler, so that the workability can be enhanced.

In addition, since the outer panel for the side body 15 is not formed to extend down to the lower end of the side sill 2, weight and cost can be reduced. Therefore, the outer reinforcement for the side sill is arranged in an outermost surface of the vehicle, so that it is possible to form a large transverse cross section of the outer reinforcement for the side sill 8, and therefore, an advantageous effect of increasing the rigidity thereof can be achieved.

What is claimed is:

1. A lower structure of vehicle front pillars, comprising:
paired right and left side sills being arranged in lower portions on both lateral sides of a vehicle, respectively, so as to extend in a vehicle front and rear directions;
an outer reinforcement for the side sill forming an outer portion, in a vehicle width direction, of each side sill;
an inner panel for the side sill being arranged on an inner side, in the vehicle width direction, of each side sill;
front pillars being formed so as to stand on front ends of the side sills, respectively:
a hinge for a front door being attached to each front pillar; and
outer panels for side bodies covering outer reinforcements for the respective front pillars and parts of the respective side sills, respectively;
wherein each outer reinforcement for the side sill is segmented, in the vehicle front and rear direction, into three parts, such as a first component, a second component, and a third component positioning sequentially from a front of the vehicle;
wherein strengths of the first, second, and third components are set to be higher sequentially in this order;
wherein the first, second, and third components are joined and integrated together;
wherein a front end flange of the first component is joined to a front end flange of the inner panel for the side sill, and a rear end portion of the first component is joined to a front end portion of the second component; and
wherein a front end portion of the third component has a cross sectional shape becoming narrower toward the front of the vehicle, and a front end of the third component is arranged so as to overlap with the hinge for the front door in the vehicle front and rear direction.

2. The lower structure of the vehicle front pillars according to claim 1, wherein the strengths of the first, second, and third components are set to be higher sequentially in this order by making thicknesses of the first, second, and third components larger sequentially in this order, or by raising material strengths of the first, second, and third components larger sequentially in this order.

3. The lower structure of the vehicle front pillars according to claim 1, wherein the third component, the second component, and the inner panel for the side sill are bolted to one another.

4. The lower structure of the vehicle front pillars according to claim 1, wherein the first component is configured as a drawn product so that a separating line between components does not appear on a surface of the front end of each side sill.

5. The lower structure of the vehicle front pillars according to claim 1, wherein each outer panel for the side body and the corresponding outer reinforcement for the front pillar have lower edges, respectively, and the lower edges are aligned on a substantial center, in a vertical direction, of the corresponding side sill.

6. The lower structure of the vehicle front pillars according to claim 1, wherein the front end of the third component is aligned on a position of a front end of the second component in the vehicle front and rear direction.

7. The lower structure of the vehicle front pillars according to claim 1, wherein a rear end portion of the second component is overlapped with the front end portion of the third component from outside in the vehicle width direction and is joined thereto, and a part of the front end portion of the third component which is in front of a joined part between the third component and the rear end portion of the second component, has a cross sectional shape which becomes narrower toward the front of the vehicle.

8. The lower structure of the vehicle front pillars according to claim 1, wherein the front end portion of the third component has a cross sectional shape which becomes narrower toward inside in the vehicle width direction such that a depth thereof in the vehicle width direction becomes shallower while heading to the front of the vehicle.

* * * * *